Aug. 11, 1959  J. H. DENN  2,898,977
TIRE RIM REMOVAL TOOL
Filed Jan. 3, 1957

INVENTOR.
JOHN H. DENN
BY
Woodhams Blanchard & Flynn
ATTORNEYS

United States Patent Office 2,898,977
Patented Aug. 11, 1959

2,898,977

TIRE RIM REMOVAL TOOL

John H. Denn, Detour, Mich.

Application January 3, 1957, Serial No. 632,323

3 Claims. (Cl. 157—1.33)

This invention relates in general to a tool for removing the rims from vehicle tires and, more particularly, to a type of rim removal tool adapted for use on the relatively large wheels of heavy-duty equipment utilizing pneumatic tires, the supporting rims of which are comprised of pairs of spaced rings.

Many types of heavy-duty equipment, such as earth moving and earth hauling vehicles, are supported upon relatively large, pneumatic tires. Due to the size, shape and corresponding stiffness of the casings of these large tires, they are often mounted upon a pair of circular rings, instead of the single, conventional rims. Said rings are in turn mounted upon, and supported by, a central hub member. It is a well known fact that, in order to give these tire casings added protection against the sharp and abrasive objects on the ground with which they come in contact during normal use and, further, to give them the necessary strength to support heavy loads, they are impregnated with wear-resistant materials. These materials often react, with moisture and other common elements which the tires contact, to form an extremely strong bond between said rings and the tire casings. The fact that the side walls of the tire casings can be irreparably damaged, if treated roughly during the separation of the rings from the tire casings, further aggravates the problem of removing the rings. One presently recommended method of removing the sliding or rim rings from the tire casings is set forth in the "Operator's Manual" (Form No. 0-246—Revised) for the "Super C Tournadozer," published by R. G. LeTourneau, Inc., of Peoria, Illinois. According to such method, wooden wedges are driven between the tire casing and the rings in order to separate them. It is not unusual for this removal procedure to require in excess of 16 man hours, constituting the continuous, combined efforts of at least two skilled workmen. Furthermore, despite the care exercised in removing the rings from the casings with this method, serious damage to said tire casings very often occurs.

Aside from the fact that removal of rings from heavy-duty tire casings, according to present practices, is a costly operation, it also results in an even more costly tie-up of the machine upon which the wheel is used, while the tire is being removed from said rings.

Accordingly, a primary object of this invention is the provision of a tool whereby one relatively unskilled workman can easily and quickly remove the rings from a large, relatively stiff, pneumatic tire casing of the type used on heavy-duty vehicles.

A further object of this invention is the provision of a rim removal tool, as aforesaid, which can effect the removal of the rim rings from the tire casing in a fraction of the time presently required for such removal, with little or no physical exertion being made by the person effecting such removal, and without causing any damage to the tire casing during the removal of the rings therefrom.

A further object of this invention is the provision of a rim removal tool, as aforesaid, which is simple to operate, which can be easily and quickly adjusted to tires and rim rings of different sizes, and which is sufficiently small and compact that it can be easily stored with, and carried around as a part of, the conventional tire removal equipment of the particular vehicle involved.

Other objects and purposes of this invention will become apparent to persons familiar with this type of equipment upon reading the following specification and examining the accompanying drawings, in which.

Figure 1:
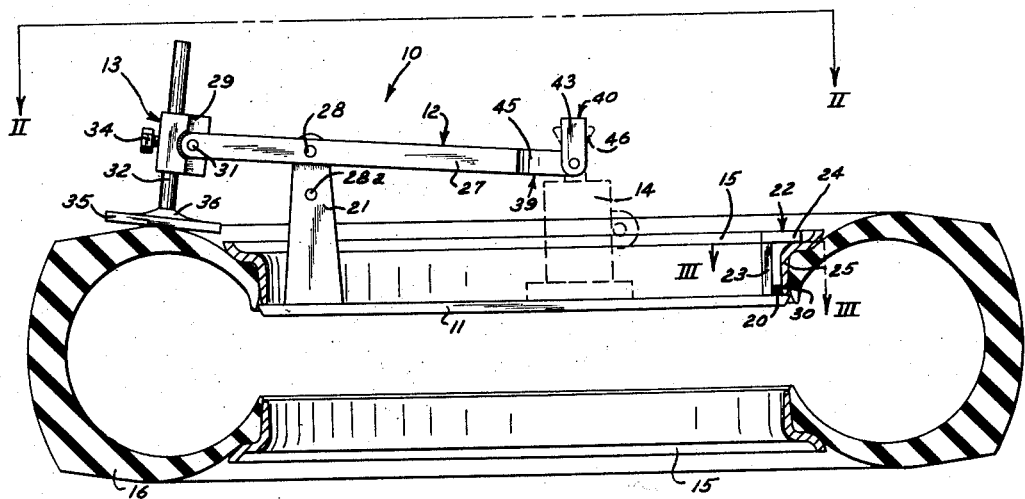
Figure 1 is a side elevational view of the rim removal tool, to which this invention relates, in operating position with respect to a rim ring mounted tire.

For the purpose of convenience in description, the terms "upper," "lower," and derivatives thereof, will have reference to the rim removal tool, and parts thereof, in its normal position of operation, as appearing in Figure 1. The terms "inner," "outer," and derivatives thereof, will have reference to the geometric center of the vehicle wheel and parts thereof. The terms "left," "right," and derivatives thereof, will have reference to the leftward and rightward ends, respectively, of the rim removal tool, as appearing in Figures 1 and 2.

General description

Figure 2:
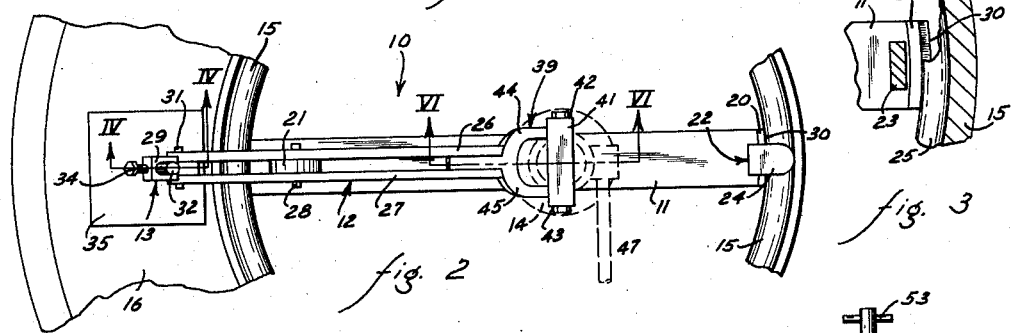
Figure 2 is a sectional view substantially as taken along the line II—II of Figure 1.

In order to meet the above mentioned objects and purposes of this invention, as well as others related thereto, I have provided a tire rim removal tool 10 (Figures 1 and 2), comprised of an elongated base bar 11, having a laterally extending post 21 upon which a lever arm 12 is pivotally supported between its ends for movement about an axis which is transverse of the bar 11 and the post 21. The leftward end of the arm 12, as appearing in Figures 1 and 2, is provided with a tire engaging head 13, and the rightward end of said arm 12 is engageable by means, such as the hydraulic jack 14, whereby the rightward end of said arm is raised and the leftward end is lowered. Thus, by placing the ends of the base bar 11 under diametrically disposed portions of a wheel rim ring 15 and then causing the head 13 to engage the tire casing 16 near the leftward end of said base bar 11, downward movement of the leftward end of the lever arm 12 will cause the rim ring 15 to be stripped from the adjacent portion of the tire casing 16.

Detailed description

Figure 5:
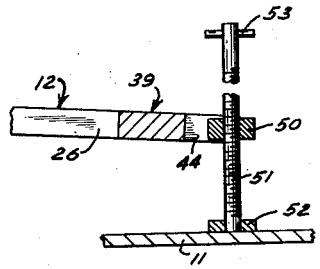
Figure 5 is a fragmentary, sectional view of a wheel of the type upon which the tool of this invention is used, when said wheel is mounted on the wheel hub of a vehicle.

As shown in Figures 1 and 2, the base bar 11 is, in this particular embodiment, an elongated, relatively flat and rigid bar, which may be fabricated from steel, and which is slightly longer than the inside diameter of said wheel rim ring 15. The rim ring is of the type wherein a pair of such rings are mounted upon the tire casing 16 for supporting said casing upon a wheel hub 17, which is in turn mounted upon an axle 18 in a substantially conventional manner and as shown in Figure 5. A lock ring 19 is provided for holding the wheel and rim rings 15 on said hub 17.

Figure 3:
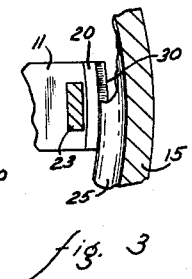
Figure 3 is a sectional view taken along the line III—III of Figure 1.

The pivot post 21 is secured to, and extends upwardly from, the base bar 11 near, but spaced from, one end thereof. An L-shaped guide angle 22 (Figures 1 and 3)

has a vertical flange 23, which is secured to the base bar 11 near, but spaced from, the other end thereof, and extends from said base bar 11 in substantially the same direction as said pivot post 21. The other flange 24 of said guide angle 22 extends horizontally from the upper end of the vertical flange 23, away from the pivot post 21. The distance between the horizontal flange 24 and the base bar 11 is slightly greater than the axial thickness of the inner flange 25 on the rim ring 15. Thus, as shown in Figure 1, said inner flange 25 of the rim ring 15 is snugly disposable between the horizontal flange 24 and the adjacent portion of the base bar 11.

A ring engaging stop 20 (Figures 1 and 3), having an arcuate, rightward face 30, is mounted upon the upper surface of the base bar 11 between the vertical flange 23 and the rightward end of the bar 11. The face 30 on the stop 20 is preferably shaped to conform with, and engage, the radially inner surface of the rim ring 15, hence, of its inner flange 25. The distance between the face 30 and the rightward end of the bar 11 is preferably about equal to one-half the difference between the length of said bar 11 and the internal diameter of the rim ring 15 with which it is used. Thus, the bar 11 will extend about equidistantly under diametrically opposite portions of the flange 25 when the face 30 is against the flange 25.

The distance between the leftward side of the pivot post 21 and the rightward end of the base bar 11 is slightly less than the internal diameter of the rim ring 15 to permit said bar 11 to pass through said rings 15, as described hereinafter. The distance between the post 21 and the leftward end of the bar 11 is at least equal to the difference between the length of the bar 11 and the internal diameter of the rim ring 15.

Under some circumstances, the stop 20 may be omitted and the guide angle 22 located so that the vertical flange thereof is utilized to engage the said radially inner surface of the flange 25.

The lever arm 12 (Figures 1 and 2) is comprised of a pair of parallel bars 26 and 27, which are disposed upon opposite sides of the pivot post 21 and are pivotally mounted between their ends upon the upper end of said pivot post by means of the pivot pin 28. A lower opening 28a is provided in the pivot post 21, whereby the lever arm 12 may be pivoted closer to the base bar 11.

Figure 4:
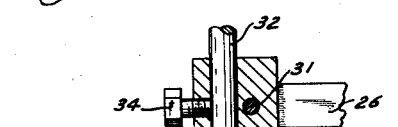
Figure 4 is a sectional view taken along the line IV—IV of Figure 2.

The tire engaging head 13 (Figures 1, 2 and 4) includes a body member 29, which is pivotally supported upon, and between, the leftward ends of the bars 26 and 27 by means of the pivot pin 31. A thrust rod 32 is slidably disposed within a rod opening 33 through the body member 29 transversely of the axis of the pivot pin 31. A lock bolt 34 is threadedly received through the body member 29 and extendable into the rod opening 33 for holding said thrust rod 32 against movement with respect to the body member 29. A thrust plate 35 has a socket 36 near the center thereof, into which the lower end of the thrust rod 32 is pivotally disposable. The body member 29 is so positioned with respect to the pivot post 21 that the thrust plate 35 will be properly engaged both by the side wall of the tire casing 16 and the thrust rod 32 when the leftward end of the lever arm 12 is urged downwardly, as appearing in Figure 1.

A yoke 39 (Figures 1 and 2) is rigidly secured upon, and between, the rightward ends of the bars 26 and 27 and extends rightwardly therefrom, directly above the base bar 11. A U-shaped stirrup 40, having a cross-bar 41 and a pair of legs 42 and 43, is arranged with said legs pivotally supported upon the arms 44 and 45, respectively, of said yoke 39. Suitable force-applying means, such as the hydraulic jack 14, may be supported upon the base bar 11 so that its lift rod 46 engages the cross-bar 41 of the stirrup 40, said lift rod 46 extending up through, and between, the arms of the yoke 39. The distance between the stirrup 40 and the pivot post 21 is substantially greater than the distance between the pivot post 21 and the tire engaging head 13, thereby providing a mechanical advantage in the lever arm 12. The hydraulic jack 14 is provided with an actuating handle 47 in a substantially conventional manner, whereby the left rod 46 can be pumped upwardly.

Alternatively, the stirrup 40 may be replaced by a nut 50 (Figure 6), which is pivotally supported upon, and between, the arms of the yoke 39. An elongated screw 51 may then be threadedly received through the nut 50 and rotatably supported at its lower end within the bearing seat 52 mounted upon the base bar 11, directly below the rightward end of the lever arm 12. The upper end of the screw 51 is provided with a cross-bar 53, in a conventional manner, for effecting a turning of the screw 51, whereby the rightward end of the lever arm 12 may be raised.

It will be recognized that the tool 10 can be quickly and easily adapted for use with tires of various sizes simply by providing a plurality of base bars 11 of various sizes, each such base bar being equipped with a pivot post 21 and a guide angle 22. The exchange of one base bar 11 for another can be quickly effected simply by removing the pivot pin 28 and mounting the lever arm 12 upon the pivot post 21 of another base bar 11.

*Operation*

Under normal circumstances, the rim ring mounted tire, from which it is desired to remove the rim rings 15, is first removed from the wheel hub 17 (Figure 5), after removing the lock ring 19, in a substantially conventional manner. Said rim ring mounted tire is then placed upon the ground or other supporting surface so that it is in a substantially horizontal position, as viewed in Figure 1. The inner tube is removed from within the tire casing 16, and the leftward, or post, end of the base bar 11 is then inserted beneath the lower edge of the inner flange 25 of the rim ring 15, with the post 21 extending upwardly. Said bar 11 is then moved leftwardly, as appearing in Figures 1 and 2, against the contrary urging of the adjacent bead on the tire casing 16, until the rightward end of the base bar 11 can pass through the ring 15 and be inserted beneath the diametrically opposite portion of said ring. As the rightward end of the base bar 11 slides under the rim ring 15, the upper edge of the flange 25 will be engaged by the horizontal flange 24 of the guide angle 22, and the radially inner surface of said flange 25 will be engaged by the arcuate face 30 on the stop 20. Thus, radially outward movement, and axial movement in either direction, of the rightward end of the base bar 11 is positively prevented.

The tire engaging head 13 (Figures 1 and 4) is now arranged so that the thrust plate 35 is resting upon the upper side of the casing 16 and so that the thrust rod 32 is firmly held within the body member 29 and snugly seated within the socket 36 in said thrust plate 35. Suitable force-applying means, such as the hydraulic jack 14, is then placed upon the base bar 11 beneath the yoke 39, so that the lift rod 46 of said jack engages the cross-bar 41 of the stirrup 40. The lift rod 46 is raised in a conventional manner by operating the handle 47 of said jack until the downward movement of the thrust plate 35 and the corresponding upward movement of the rim ring 15 effects a disengagement therebetween in the region of the leftward end of the base bar 11. The pivotal support of the body member 29 and the stirrup 40 upon the lever arm 12 automatically adjusts for the changing position of the lever arm 12 during the operation of the tool 10. When separation of the casing 16 and rim ring 15 occurs, the pressure in the hydraulic jack 14 is released and the tool 10 is moved to a new position with respect to said ring 15, either by rotating said tool about the axis of the wheel, or by completely removing said tool from its position on said ring 15 and placing it in a new position. Both the removal and replacement of said tool 10 are effected in substantially the same manner as stated hereinabove, except that said removal follows a reverse procedure to that above described. When one rim ring has been removed from the tire casing 16, the tire is then turned over on its other side and the above described procedure used for removing the other rim ring.

Figure 6:
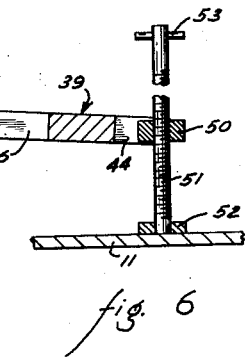
Figure 6 is a fragmentary, sectional view substantially as taken along the line VI—VI of Figure 2 and disclosing an alternate structure.

The alternate structure, shown in Figure 6, does not materially change the operation of the tool 10, as set forth hereinabove. The principal difference resides in the fact that raising of the rightward end of the lever arm 12 is effected by turning the screw 51, instead of operating the handle 47 on the hydraulic jack 14.

Although particular, preferred embodiments of the invention have been disclosed in detail hereinabove for illustrative purposes, it will be understood that variations or modifications thereof, which do not depart from the scope of such disclosure, are fully contemplated unless specifically stated to the contrary in the appended claims.

I claim:

1. A tool for removing a rim ring from a resilient tire casing, comprising: an elongated base bar, slightly longer than the internal diameter of the rim ring; guide means secured to said base bar near one end thereof and including a stop member for engaging the radially inner surface of the rim ring, said stop member extending transversely from said base bar and being spaced from said one end a distance slightly greater than one-half the difference between the internal diameter of said ring and the length of said base bar, said guide means also including means engageable with said rim ring for preventing axial movement of the rim ring with respect to said base bar; a pivot post secured to, and extending upwardly from, said base bar near the other end thereof, said pivot post being spaced from said other end a distance at least equal to the difference between the internal diameter of said ring and the length of said base bar; a lever arm pivotally mounted between the ends thereof upon said pivot post for rotation about an axis transverse of the longitudinal extent of said pivot post and said base bar; a tire engaging head pivotally supported upon that end of said lever arm remote from said guide means; and means associated with the other end of said lever arm for urging same away from said base bar.

2. The structure of claim 1, wherein said tire engaging head includes a body member pivotally supported upon said lever arm, a thrust rod adjustably extending through said body member transversely of the pivotal axis thereof, and a thrust plate engageable with one end of said thrust rod.

3. The structure of claim 1, wherein said guide means includes an angle member extending upwardly from said base bar from a point located inwardly of said stop member, said angle member having a flange extending outwardly and overlying and spaced vertically from said one end of said base bar so that the rim ring may be received therebetween and held against axial movement thereby.

References Cited in the file of this patent

UNITED STATES PATENTS

| | | |
|---|---|---|
| 2,512,864 | Koester | June 27, 1950 |
| 2,749,975 | Curtis | June 12, 1956 |

FOREIGN PATENTS

| | | |
|---|---|---|
| 623,147 | France | June 16, 1927 |